United States Patent [19]
Murata et al.

[11] Patent Number: 5,061,667
[45] Date of Patent: * Oct. 29, 1991

[54] CATALYTIC COMPONENT FOR OLEFIN POLYMERIZATION

[75] Inventors: Masahide Murata; Seizaburo Kanazawa; Hiroyuki Furuhashi; Kouji Maruyama; Masafumi Imai; Hiroshi Ueno, all of Saitama, Japan

[73] Assignee: Toa Nenryo Kogyo KK (Tonen Corporation), Tokyo, Japan

[*] Notice: The portion of the term of this patent subsequent to Mar. 21, 2006 has been disclaimed.

[21] Appl. No.: 576,106

[22] Filed: Aug. 29, 1990

Related U.S. Application Data

[63] Continuation of Ser. No. 247,840, Sep. 22, 1988, abandoned, which is a continuation-in-part of Ser. No. 132,751, Dec. 14, 1987, Pat. No. 4,814,312.

[30] Foreign Application Priority Data

Sep. 22, 1987 [JP] Japan ................................ 62-236272

[51] Int. Cl.$^5$ .............................................. C08F 4/654
[52] U.S. Cl. .................................... 502/116; 502/108; 502/111; 502/115; 502/121; 502/122; 502/123; 502/125; 502/127; 526/124
[58] Field of Search ............... 502/108, 111, 115, 116, 502/121, 122, 123, 125, 127

[56] References Cited

U.S. PATENT DOCUMENTS 4,295,991 10/1981 Wristers ......................... 502/108 X
4,814,312 3/1989 Murata et al. ...................... 502/111

FOREIGN PATENT DOCUMENTS 053899 6/1982 European Pat. Off. .
133383 2/1985 European Pat. Off. .
171200 2/1986 European Pat. Off. .
174104 3/1986 European Pat. Off. .

*Primary Examiner*—Patrick P. Garvin
*Attorney, Agent, or Firm*—Ben C. Cadenhead; Myron B. Kurtzman; T. Dean Simmons

[57] ABSTRACT

A catalytic component for olefin polymerization, produced by a process which comprises causing (A) magnesium metal, (B) a halogenated hydrocarbon represented by the general formula, RX [wherein R stands for an alkyl group, an aryl group, or a cycloalkyl group each having 1 to 20 carbon atoms and X for a halogen atom], and (C) a compound represented by the general formula, $X_n^1 M(OR^1)_{m-n}$ [wherein $X^1$ stands for a hydrogen atom, a halogen atom, or a hydrocarbon group having 1 to 20 carbon atoms, M for a boron, carbon, aluminum, silicon, or phosphorus atom, $R^1$ stands for a hydrocarbon group having 1 to 20 carbon atoms, m for the valency of M, and $m > n \geq 0$] to contact (D) a halogen-containing alcohol and then contact (E) an electron donating compound and (F) a titanium compound thereby forming a titanium-containing solid substance, and causing said titanium-containing solid substance, in the presence of (G) an organic aluminum compound, to contact (H) an olefin thereby allowing said titanium-containing solid substance to incorporate therein a corresponding olefin polymer in a ratio in the range of 0.1 to 100 g per g of said titanium-containing solid substance.

7 Claims, No Drawings

CATALYTIC COMPONENT FOR OLEFIN POLYMERIZATION

This is a continuation of application Ser. No. 247,840, filed 9/22/88 now abandoned, which was a continuation-in-part of U.S. Ser. No. 132,751 filed Dec. 14, 1987 and now U.S. Pat. No. 4,814,312.

FIELD OF THE INVENTION

This invention relates to a catalytic component for olefin polymerization.

DESCRIPTION OF THE PRIOR ART

A number of catalytic components for olefin polymerization have been proposed which permit production of polyolefins such as polypropylene with high stereospecificity and narrow particle size distribution in high yields.

For example, a method which comprises causing a titanium compound and an electron donating compound to contact a solid substance obtained by the reaction of an ester of orthosilicic acid with an organic magnesium compound or a solid substance obtained by the reaction of magnesium metal, an ester of orthosilicic acid, and a halogenated hydrocarbon (Japanese Patent Application Disclosure SHO 53 (1978)-146,292) and a method which comprises causing an electron donating compound and a titanium compound to contact a solid substance obtained by mutual contact of magnesium metal, a halogenated hyrocarbon, and a compound represented by the general formula, $X_mC(OR)_{4-m}$ (Japanese Patent Application Disclosure SHO 56 (1981)-34,707) have been known as methods capable of producing catalytic components.

The catalytic components which are obtained by these conventional methods, however, are still deficient in activity for polymerization. The inventors formerly developed a catalytic component exhibiting highly desirable activity for polymerization by causing a halogen-containing alcohol to contact the solid substance obtained by the aforementioned method and then causing an electron donating compound and a titanium compound to contact the product of the first contact (U.S. Ser. No. 132,751 filed Dec. 14, 1987).

When this catalytic component is used in polymerization, probably because of inferior mechanical strength of the catalytic component itself, it is liable to inflict breakage upon the formed polymer and turn the polymer into a finely divided powder. This catalytic component, therefore, cannot be safely applied to a process using a fluidized-bed type polymerization device which abhor a finely divided polymer.

PROBLEM FOR SOLUTION BY THE INVENTION

This invention is directed toward providing a catalytic component for olefin polymerization, which possesses high strength, restrains occurrence of finely divided polymer powder during the course of polymerization, and exhibits a highly desirable activity for polymerization.

INVENTION FOR SOLUTION OF THE PROBLEM

The inventors have now found that a catalytic component obtained by causing an olefin, in the presence of an organic aluminum compound to contact the aforementioned catalytic component of their own development meets the object of this invention. This invention has been perfected as the result.

SUMMARY OF THE INVENTION

The gist of the present invention specifically resides in a catalytic component for olefin polymerization, produced by a process which comprises causing (A) magnesium metal, (B) a halogenated hydrocarbon represented by the general formula, RX [wherein R stands for an alkyl group, an aryl group, or a cycloalkyl group each having 1 to 20 carbon atoms and X for a halogen atom], and (C) a compound represented by the general formula, $X_n^1M(OR^1)_{m-n}$ [wherein $X^1$ stands for a hydrogen atom, a halogen atom, or a hydrocarbon group having 1 to 20 carbon atoms, M for a boron, carbon, aluminum, silicon, or phosphorus atom, $R^1$ for a hyrocarbon group having 1 to 20 carbon atoms, m for the valency of M, and $m > n \geq 0$] to contact (D) a halogen-containing alcohol and then contact (E) an electron donating compound and (F) a titanium compound thereby forming a titanium-containing solid substance, and causing the titanium-containing solid substance, in the presence of (G) an organic aluminum compound, to contact (H) an olefin thereby allowing the titanium-containing solid substance to incorporate therein a corresponding olefin polymer in a ratio in the range of 0.1 to 100 g per g of the titanium-containing solid substance.

RAW MATERIALS FOR PREPARATION OF TITANIUM-CONTAINING SOLID SUBSTANCE

(A) Magnesium Metal

Though magnesium metal can be used effectively in practically any form, it is used particularly advantageously in the form of powder or chips. The magnesium metal is desired to be washed with an inactive hydrocarbon such as, for example, a saturated aliphatic, alicyclic, or aromatic hydrocarbon having 6 to 8 carbon atoms and then dried by heating in the presence of an inactive gas such as nitrogen before it is used herein.

(B) Halogenated hydrocarbon

Of the halogenated hydrocarbons represented by the general formula, RX chlorinated or brominated hydrocarbons having an alkyl, aryl, or cycloalkyl group of 1 to 8 carbon atoms as R prove to be particularly desirable. Concrete examples of such desirable halogenated hydrocarbons are methyl, ethyl, isopropyl, n-butyl, n-octyl, and cyclohexyl chlorides, bromides, chlorobenzenes, and o-chlorotoluene.

(C) Compound of General Formula, $X_n^1M(OR^1)_{m-n}$

In the formula, M, $X^1$, $R^1$, m and n have the same meanings as defined above. $X^1$ may be otherwise a halogen-substituted hydrocarbon group having 1 to 20 carbon atoms. When $X^1$ is a hydrocarbon group, $X^1$ may be equal to or different from $R^1$. Hereinafter, the compounds of the aforementioned general formula will be referred to simply as alkoxy compounds.

As examples of the hydrocarbon group, there can be cited alkyl groups such as methyl, ethyl, propyl, i-propyl, butyl, amyl, hexyl, octyl, 2-ethylhexyl, and decyl, cycloalkyl groups such as cyclopentyl, cyclohexyl, and methylcyclohexyl, alkenyl groups such as allyl, propenyl, and butenyl, aryl groups such as phenyl, tolyl, and xylyl, and aralkyl groups such as phenethyl and 3-phenylpropyl. In these hydrocarbon groups, alkyl groups having 1 to 10 carbon atoms prove to be particularly desirable. Examples of alkoxy compounds follow:

1. Compounds having carbon as M

Compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OC_3H_{17})_4$; compounds of the formula, $X^1C(OR^1)_3$, including $HC(OCH_3)_3$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$; $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$; $CH_2BrC(OC_2H_5)_3$, $CH_2ClC(OC_2H_5)_3$, $CH_3CHBrC(OC_2H_5)_3$, $CH_3CHClC(OC_2H_5)_3$; $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$, and $BrC(OC_2H_5)_3$; and compounds of the formula, $X_2^1C(Or^1)_2$, including $CH_3CH(OCH_3)_2$, $CH_3CH(OC_2H_5)_2$, $H_2(OCH_3)_2$, $CH_2(OC_2H_5)_2$, $CH_2ClCH(OC_2H_5)_2$, $CH_2Cl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

2. Compound having silicon as M

Compounds of the formula, $Si(OR^1)_4$, including $Si(OCH_3)_4$, $Si(OC_2H_5)_4$, $Si(OC_4H_9)_4$, $Si(Oi-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; compounds of the formula, $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5SiOC_2H_5)_3$, $C_4H_9Si(OC_2H_5)_3$, $C_6H_5Si(OC_6H_5)_3$, $C_2H_5Si(OC_6H_5)_3$, $ClSi(OCH_3)_3$, $ClSi(OC_2H_5)_2$, $ClSi(OC_3H_7)_3$, $ClSi(OC_6H_5)_3$, and $BrSi(OC_2H_5)_3$; compounds of the formula, $R_2Si(OR^1)_2$, including $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISiH(OC_2H_5)_2$; and compounds of the formula, $R_3SiOR^1$, including $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3SiOC_2H_5$.

3. Compounds having boron as M

Compounds of the formula, $B(OR^1)_3$, including $B(OC_2H_5)_3$, $B(OC_4H_9)_3$, $B(OC_6H_{13})_3$, and $B(OC_6H_5)_3$.

4. Compounds having aluminum as M

Compounds of the formula, $Al(OR^1)_3$, including $Al(OCH_3)_3$, $Al(OC_2H_5)_2$, $Al(OC_3H_7)_3$, $Al(Oi-C_3H_7)_3$, $Al(OC_4H_9)_3$, $Al(Ot-C_4H_9)_3$, $Al(OC_6H_{13})_3$, and $Al(OC_6H_5)_3$.

5. Compounds having phosphorus as M.

Compounds of the formula, $P(OR^1)_3$, including $P(OCH_3)_3$, $P(OC_2H_5)_3$, $P(OC_4H_9)_3$, $P(OC_6H_{13})_3$, $P(OC_6H_5)_3$.

(D) Halogen-containing Alcohol

The term "halogen-containing alcohol" as used in this invention means a compound which has a halogen atom substituted for at least one desired hydrogen atom other than the hydrogen atom of a hydroxyl group in a monohydric or polyhydric alcohol. As examples of the halogen atom, there can be cited chlorine, bromine, iodine, and fluorine atoms. Chlorine atom proves to be particularly desirable.

Illustrative of the compound referred to herein as "halogen-containing alcohol," there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propanediol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-a-methylbenzyl alcohol, 2-chloro-4-phenylphenol, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcin, (m,o,p)-fluorophenol, and p-iodophenol; 2,2-dichloroethanol, 2,3-dichloro-1-propanol, 1,3-dichloro-2-propanol, 3-chloro-1-(a-chloromethyl)-1-propanol, 2,3-dibromo-1-propanol, 1,3-dibromo-2-propanol, 2,4-dibromophenol, and 2,4-debromo-1-naphthol; 2,2,2-trichloroethanol, 1,1,1-trichloro-2-propanol, $\beta,\beta,\beta$-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, $a,a,a$-trifluoro-m-cresol, and 2,4,6-triiodophenol; and 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol, and tetrafluororesorsin.

(E) Electron Donating Compound

Examples of the electron donating compound include carboxylic halogenides, alcohols, ethers, ketones, amines, amides, nitriles, aldehydes, alcoholates, phosphorus, arsenic, and antimony compounds bound to organic groups through the medium of carbon or oxygen, phosphamides, thioethers, thioesters, and carbonic esters. Among other electron donating compounds cited above, carboxylic acids, carboxylic anhydrides, carboxylic esters, carboxylic halogenides, alcohols, and ethers are used particularly desirably.

As concrete examples of the carboxylic acid, there can be cited aliphatic monocarboxylic acids such as formic acid, acetic acid, propionic acid, butyric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebacic acid, maleic acid, and fumaric acid; aliphatic oxycarboxylic acids such as tartaric acid; alicyclic carboxylic acids such as cyclohexane monocarboxylic acid, cyclohexene monocarboxylic acid, cis-1,2-cyclohexane dicarboxylic acid, and cis-4-methylcyclohexane-1,2-dicarboxylic acid; aromatic monocarboxylic acids such as benzoic acid, toluic acid, anisic acid, p-tertiary butylbenzoic acid, naphthoic acid, and cinnamic acid; and aromatic polycarboxylic acids such as phthalic acid, isophthalic acid, terephthalic acid, naphthalic acid, trimellitic acid, hemitrimellitic acid, trimesic acid, pyromellitic acid, and mellitic acid.

The carboxylic anhydrides usable as electron donating compounds herein are the anhydride derived from the carboxylic acids enumerated above.

The carboxylic esters usable as electron donating compounds herein are the monoesters and polyesters derived from the carboxylic acids enumerated above. As concrete examples thereof, there can be cited butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexanecarboxylate, methyl benzoate, ethyl benzoate, methyl p-toluate, ethyl p-tertiary butylbenzoate, ethyl p-anisate, ethyl α-naphthoate, isobutyl α-naphthoate, ethyl ketocinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl tere-phthalate, dibutyl terephthalate, diethyl napthalate, dibutyl naphthalate, triethyl trimellitate, tributyl trimellitate, tetramethyl pyromellitate, tetraethyl pyrotrimellitate, and tetrabutyl pyromellitate.

The carboxylic halogenides usable as electron donating compounds herein are the halogenides derived from the carboxylic acids enumerated above. As concrete examples thereof, there can be cited acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexanecarboxylic acid chloride, cyclohexanecarboxylic acid bromide, 1-cyclohexenecarboxylic acid chloride, cis-4-methylcyclohexenecarboxylic acid chloride, cis-4-methylcyclohexenecarboxylic acid bromide, benzoyl chloride, benzoyl bromide, p-toluic acid chloride, p-toluic acid bromide, p-anisic acid chloride, p-anisic acid bromide, α-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Further, such monoalkyl halogenides of dicarboxylic acids as adipic acid monomethyl chloride, maleic acid monoethyl chloride, maleic acid monomethyl chloride, and phthalic acid butyl chloride are similarly usable.

The alcohols usable as electron donating compounds herein are represented by the general formula, ROH, wherein R stands for an alkyl, alkenyl, cycloalkyl, aryl, or aralkyl each having 1 to 12 carbon atoms. As concrete examples thereof, there can be cited methanol, ethanol, propanol, isopropanol, butanol, isobutanol, pentanol, hexanol, octanol, 2-ethylhexanol, cyclohexanol, benzyl alcohol, alkyl alcohol, phenol, cresol, xylenol, ethyl phenol, isopropyl phenol, p-tertiary butyl phenol, and n-octyl phenol. The ethers usable as electron donating compounds herein are represented by the general formula, $ROR^1$, wherein R and $R^1$ independently stand for an alkyl, alkenyl, cycloalkyl, aryl, or aralkyl each having 1 to 12 carbon atoms. As concrete examples thereof, there can be cited diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisol, and ethylphenyl ether. Any of the aforementioned halogen-containing alcohols are similarly usable.

(F) Titanium Compound

The titanium compounds usable herein are divalent, trivalent, and tetravalent titanium compounds. As concrete examples thereof, there can be cited titanium tetrachloride, titanium tetrabromide, trichloroethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds cited above, such tetravalent titanium halogenides as titanium tetrachloride, trichloroethoxy titanium, dichlorodibutoxy titanium, and dichlorodiphenoxy titanium are used particularly advantageously. Especially, titanium tetrachloride is desirable.

Method for Preparation of Titanium Containing Solid Substance

The titanium-containing solid substance contemplated by the present invention is obtained by placing magnesium metal, a halogenated hydrocarbon, and the alkoxy compound into mutual contact thereby forming a magnesium-containing solid substance; bringing a halogen-containing alcohol (component A) into contact with the magnesium-containing solid substance, and then bringing an electron donating compound (component B) and a titanium compound (component C) further into contact therewith.

(1) Contact of Magnesium, Halogenated Hydrocarbon, and Alkoxy Compound

No particular method is specified for the contact of these three compounds. The contact may be effected by any of the methods available for the purpose. For example, (a) a method which comprises simultaneously bringing the three compounds into mutual contact, (b) a method which comprises preparatorily bringing magnesium metal into contact with a halogenated hydrocarbon thereby forming a product of contact or securing an equivalent to the product of contact, namely a so-called Grignard reagent such as, for example, $ClMgCH_3$, $ClMgC_2H_5$, $ClMgC_3H_7$, $ClMgC_4H_9$, $ClMgi-C_4H_9$, $ClMgC_6H_{13}$, $ClMgC_8H_{17}$, $BrMgC_2H_5$, $BrMgC_4H_9$, $BrMgi-C_4H_9$, $IMgC_4H_9$, $ClMgC_6H_5$, or $BrMgC_6H_5$, and causing the product of contact or the equivalent thereto to contact the aforementioned alkoxy compound, (c) a method which effects the contact by suspending magnesium metal in the alkoxy compound and adding a solution of a halogenated hydrocarbon to the suspension, or (d) a method which effects the contact by bringing the alkoxy compound into contact with the halogenated hydrocarbon and subsequently adding magnesium metal to the resultant product of contact can be used.

The mixing ratio of the alkoxy compound to magnesium metal is desired to be such that the product of contact contains at least one, preferably three to five, $OR^1$ groups of the alkoxy compound per magnesium atom of the magnesium metal. In the case of an alkoxy compound represented by the formula, $X_2^1C(OR^1)_2$, the amount of the alkoxy compound to be used is desired to be at least 0.5 mol, preferably 1.5 to 2.5 mols, per gram atom of magnesium. In the case of an alkoxy compound represented by the formula, $X^1C(OR^1)_3$, the amount of the alkoxy compound is desired to be at least ⅓ mol, preferably 1 to 5/3 mols, on the same basis. The amount of the halogenated hydrocarbon to be used is desired to be in the range of 1 to 2 mols per gram atom of magnesium.

The catalytic reaction is attained by stirring the three compounds at a contact temperature in the range of 40° to 250° C., preferably 60° to 120° C., for a contact time in the range of 1 to 10 hours. This reaction may be performed in the presence of the same inactive hydrocarbon as used previously for the desiccation of magnesium metal such as, for example, an aliphatic, alicyclic, or aromatic hydrocarbon each having 6 to 8 carbon atoms.

Further, for the purpose of promoting this reaction, there can be used iodine, an alkyl iodide, or an inorganic halide such as calcium chloride, copper chloride, manganese chloride, or hydrogen halogenide.

The solid substance which is prepared by this reaction may be washed with a proper detergent such as, for example, the aforementioned inactive hydrocarbon before it is brought into contact with the halogen-containing alcohol.

(2) Contact With Halogen-containing Alcohol

The contact of the magnesium-containing solid substance obtained in (1) above with the halogen-containing alcohol (component A) is desired to be carried out by stirring them in the presence of an inactive medium. Examples of the inactive medium usable herein include hydrocarbons such as pentane, hexane, heptane, octane, decane, cyclohexane, benzene, toluene, and xylene and halogenated hydrocarbons such as 1,2-dichloroethane, 1,2-dichloropropane, carbon tetrachloride, butyl chloride, isoamyl chloride, bromobenzene, and chlorotoluene.

The contact of these two components is generally carried out at a temperature in the range of $-20°$ C. to $+150°$ C. for a period in the range of 0.1 to 100 hours. When the contact proceeds with evolution of heat, there may be employed a method which comprises first bringing the two components gradually into mutual contact at a low temperature, starting to elevate the temperature at the time the two components in their whole amounts have been mixed, and then continuing the contact.

The amount of the component A to be used for the contact is generally desired to be in the range of 0.05 to 20 gram mols, preferably 0.1 to 10 gram mols, per gram atom of magnesium in the solid substance.

The solid product which is obtained by the contact of the solid substance with the component A is ready for the next contact. This solid product, when necessary, may be washed with the aforementioned inactive medium before it is used for the subsequent contact.

(3) Contact With Electron Donating Compound and Titanium Compound

The contact of the solid product with the electron donating compound (component B) and the titanium compound (component C) can be carried out by (a) a method which comprises bringing the solid product into contact first with the component B and then with the component C, (b) a method which comprises bringing the solid product into contact first with the component C and then with the component B, or (c) a method which comprises simultaneously bringing and compo- nent B and the component C into contact with the solid product.

Each of the steps of contact mentioned above can be accomplished by stirring the relevant components in the presence or absence of an inactive medium. As the inactive medium, any of the compounds cited above as proper examples can be used.

The contact of the solid product with the component B and the component C is generally carried out at a temperature in the range of 0° to 200° C. for a period in the range of 0.5 to 20 hours. The amount of the component B to be used is desired to be in the range of 0.005 to 10 gram mols, preferably 0.01 to 1 gram mol, per gram atom of magnesium in the solid product. The amount of the component C to be used is desired to be not less than 0.1 gram mol, preferably to be in the range of 1 to 50 gram mols, per gram atom of magnesium in the solid product.

The contact of the solid product with the component C may be performed twice or more often. It may be effected by the same method as described above. The product of the former step of contact, when necessary, may be washed with an inactive medium and then brought into contact with a fresh supply for the component C (plus the medium).

The titanium-containing solid substance can be pro as described above This solid substance, when necessary, may be washed with a hydrocarbon such as hexane, heptane, octane, cyclohexane, benzene, toluene, or xylene. Optionally the washed solid substance may be dried.

Preparation of Catalyst Component

The catalyst component contemplated by the present invention is obtained by bringing the titanium-containing solid substance obtained as described above into contact, in the presence of an organic aluminum compound, with an olefin (hereinafter this contact will be referred to as "preparatory polymerization") thereby enabling the titanium-containing solid substance to incorporate therein 0.1 to 100 g of a corresponding polyolefin per g of the titanium-containing solid substance. The organic aluminum compounds usable herein are represented by the general formula, $R_nAlX_{3-n}$ (wherein R stands for an alkyl group or an aryl group, X for a halogen atom, an alkoxy group, or a hydrogen atom, and n for a number in the range of $1 \leq n \leq 3$). Examples thereof include alkyl aluminum compounds having 1 to 18 carbon atoms, preferably 2 to 6 carbon atoms such as trialkyl aluminums, dialkyl aluminum monohalides, monoalkyl aluminum dihalides, alkyl aluminum sesquihalides, dialkyl aluminum monoalkoxides, and dialkyl aluminum monohydrides, mixtures thereof, and complex compounds thereof. As concrete examples thereof, there can be cited trialkyl aluminums such as trimethyl aluminum, triethyl aluminum, tripropyl aluminum, triisobutyl aluminum, and trihexyl aluminum; dialkyl aluminum monohalides such as dimethyl aluminum chloride, diethyl aluminum chloride, diethyl aluminum bromide, diethyl aluminum iodide, and diisopropyl aluminum chloride; monoalkyl aluminum diahalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalides such as ethyl aluminum sesquichloride; dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide., and dialkyl aluminum hydrides such as dimethyl aluminum hydride, diethyl aluminum hydride, dipropyl aluminum hydride, and diisobutyl aluminum hydride. Among other organic aluminum compounds cited above, trialkyl aluminums, particularly triethyl aluminum and triisobutyl aluminum, are used advantageously. Such a trialkyl aluminum as mentioned above may be used in combination with other organic aluminum compound. Examples of such other organic aluminum compound include diethyl aluminum chloride, ethyl aluminum dichloride, ethyl aluminum sesquichloride, diethyl aluminum ethoxide, diethyl aluminum hydride, mixtures thereof, and complex compounds thereof which are commercially available.

An organic aluminum compound having two or more aluminum atoms bound therein through the medium of an oxygen atom or nitrogen atom is also usable herein. As examples of the compound, there can be cited $(C_2H_5)_2AlOAl(C_2H_5)_2$, $(C_4H_9)_2AlOAl(C_4H_9)_2$, and

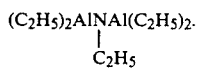

The organic aluminum compound may be used by itself or in combination with the electron donating compound. This electron donating compound may be any of the compounds cited previously as examples of the electron donating compound, component (E), for use in the preparation of the titanium-containing solid substance. Besides, electron donating compound formed of organic silicon compounds and electron donating compounds containing such hetero atoms such as nitrogen, sulfur, oxygen, and phosphorus are also usable herein.

As concrete examples of the organic silicon compound, there can be cited tetramethoxy silane, tetraethoxy silane, tetrabutoxy silane, tetraisobutoxy silane, tetraphenoxy silane, tetra (p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl tributoxy silane, butyl triphenoxy silane, isobutyl triisobutoxy silane, vinyl triethoxy silane, allyl trimethoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropoxy silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibotoxy silane, dibutyl diphenoxy silane, diisobutyl diethoxy silane, diisobutyl diisobutoxy silane, diphenyl dimethoxy silane, diphenyl diethoxy silane, diphenyl dibutoxy silane, dibenzyl diethoxy silane, divinyl diphenoxy silane, diallyl dipropoxy silane, diphenyl diallyloxy silane, methylphenyl dimethoxy silane, and chlorophenyl diethoxy silane.

As concrete examples of the hetero atom-containing electron donating compound, there can be cited such nitrogen atom-containing compounds as 2,2,6,6-tetramethyl piperidine, 2,6-dimethyl piperidine, 2,6-diethyl piperidine, 2,6-diisopropyl piperidine, 2,2,5,5-tetramethyl pyrrolidine, 2,5-dimethyl pyrrolidine, 2,5-diethyl pyrrolidine, 2,5-diisopropyl pyrrolidine, 2-methyl pyridine, 3-methyl pyridine, 4-methyl pyridine, 1,2,4-trimethyl piperidine, 2,5-dimethyl piperidine, methyl nicotinate, ethyl nicotinate, nicotinic acid amide, benzoic acid amide, 2-methyl pyrrole, 2,5-dimethyl pyrrole, imidazole, toluic acid aminde, benzonitrile, acetonitrile, aniline, paratoluidine, orthotoluidine, metatoluidine, triethyl amine, diethyl amine, dibutyl amine, tetramethylene diamine, and tributyl amine; such sulfur atom-containing compound as thiophenol, thiophene, ethyl 2-triopenecarboxylate, ethyl 3-thiophenecarboxylate, 2-methyl thiophene, methyl mercaptan, ethyl mercaptan, isopropyl mercaptan, butyl mercaptan, diethyl thioether, diphenyl thioether, methyl benzene-sulfonate, methyl sulfite, and ethyl sulfite; such oxygen atom-containing compounds as tetrahydrofuran, 2-methyl tetrahydrofuran, 3-methyl tetrahydrofuran, 2-ethyl tetrahydrofuran, dioxane, dimethyl ether, diethyl ether, dibutyl ether, diisoamyl ether, diphenyl ether, anisole, acetophenone, acetone, methylethyl ketone, acetyl acetone, ethyl 2-furalic acid, isoamyl 2-furalic acid, methyl 2-furalic acid, and propyl 2-furalic acid; and such phosphorus atom-containing compounds as triphenyl phosphine, tributyl phosphine, triphenyl phosphite, tribenzyl phosphite, diethyl phosphite, and diphenyl phosphite.

Two or more such electron donating compounds may be used in a mixed form. Optionally, the electron donating compound may be used after contact with an organic aluminum compound.

The preparatory polymerization of an olefin for the incorporation of a corresponding olefin polymer in the catalytic component of this invention can be carried out batchwise, continuously, or both. The amount of the olefin to be used for the preparatory polymerization is desired to be such that the polyolefin content of the produced catalytic component falls in the range of 0.1 to 100 g, desirably 0.2 to 50 g, and particularly desirably 0.5 to 20 g, per g of the titanium-containing solid substance.

The olefins which are usable herein include α-olefins such as propylene, 1-butene, 1-hexene, and 4-methyl-1-pentene, let alone ethylene. It is permissible to use other olefin as a comonomer in the preparatory polymerization in a ratio of not more than 5 mol %. If the amount of the olefin to be used for the preparatory polymerization exceeds the upper limit of the aforementioned range, both the catalytic activity and the physical properties of the produced polymer are adversely effected. If this amount does not reach the lower limit of the range, the object of this invention is not attained. The preparatory polymerization is desired to be carried out in an inactive hydrocarbon. The inactive hydrocarbons which are usable herein include aliphatic, alicyclic, and aromatic hydrocarbons such as propane, butane, pentane, hexane, heptane, octane, decane, kerosene, cyclohexane, benzene, toluene, and xylene.

Where the preparatory polymerization is carried out in an inert hydrocarbon, the titanium-containing solid substance is desired to be used in an amount falling in the range of 0.01 to 500 g, preferably 0.1 to 50 g, per liter of the hydrocarbon. The organic aluminum compound is used in such an amount that the aluminum titanium (atomic ratio) falls in the range of 0.01 to 500. preferably 0.5 to 100. Where the electron donating compound is used in combination with an organic aluminum compound. these two compounds are used in such amounts that the aluminum (gram atom)/electron donating compound (gram mol) falls in the range of 0.1 to 40, preferably 0.5 to 20. The temperature of the preparatory polymerization generally falls below 80° C., preferably in the range of −10° C. to +50° C. Though the preparatory polymerization is generally carried out under normal pressure, it may be performed under application of pressure. It may be carried out, when necessary, in the presence of a molecular weight regulator.

The catalytic component contemplated by this invention can be prepared as described above. This catalytic component, when necessary, may be washed with such an inactive hydrocarbon as hexane, heptane, octane, cyclohexane, benzene, toluene, or xylene. Optionally, the washed catalytic component may be dried.

Catalyst for Polymerization of Olefin

The catalytic component of this invention is combined with an organic compound of one of the metals of Groups I to III of the Periodic Table of Elements to form a catalyst for the homopolymerization of an olefin or copolymerization of the olefin with other olefin.

Organic Compound of Metal of Group I to Group III

The organic compounds which are usable herein include organic compounds of lithium, magnesium, calcium, zinc, and aluminum. Among other organic compounds mentioned above, organic aluminum compounds are particularly suitable. An organic aluminum compound for use herein is selected from among the organic aluminum compounds previously cited as examples usable in the preparation of the aforementioned catalytic component.

The organic compounds of metals other than aluminum which are usable herein include diethyl magnesium, ethyl magnesium chloride, diethyl zinc, and such compounds as $LiAl(C_2H_5)_4$ and $LiAl(C_7H_{15})_4$.

While the organic metal compound can be used alone, it may be used in combination with an electron donating compound. The electron donating compound thus used may be any of the compounds cited previously as examples usable in the preparation of the catalyst component. A suitable combination of two or more electron donating compounds may be used. The electron donating compound may be used after it has undergone a treatment of contact with the catalytic component and/or the organic metal compound.

The amount of the organic metal compound to be used with the catalytic component of this invention is generally desired to fall in the range of 1 to 2,000 gram mols, preferably 20 to 500 gram mols, per gram atom of titanium on the catalytic component.

The ratio of the organic metal compound to the electron donating compound is such that the amount of the organic metal compound as aluminum falls in the range of 0.1 to 40, preferably 1 to 25, gram atoms per mol of the electron donating compound.

Polymerization of Olefin

The catalyst which comprises the catalytic component of this invention and the organic metal compound (plus the electron donating compound) is useful as a catalyst for the homopolymerization of a monoolefin having 2 to 10 carbon atoms or for the copolymerization of the monoolefin with other monoolefin or a diolefin having 3 to 10 carbon atoms. The catalyst manifests an outstanding performance as a catalyst for the homopolymerization of an α-olefin particularly an α-olefin of 3 to 6 carbon atoms such as, for example, propylene, 1-butene, 4-methyl pentene, or 1-hexene or for the random or block copolymerization of two such α-olefins as mentioned above and/or with ethylene.

The polymerization reaction can be performed in a vapor phase or a liquid phase. Where the polymerization is to be performed in a liquid phase, it can be carried out in such an inactive hydrocarbon as normal butane, isobutane, normal pentane, isopentane, heptane, octane, cyclohexane, benzene, toluene, or xylene and a liquid monomer. The polymerization temperature generally falls in the range of −80° C. to +150° C., preferably 40° C. to 120° C. The polymerization pressure may be in the range of 1 to 60 atmospheres. The adjustment of the molecular weight of the polymer to be obtained is effected by using hydrogen or some other well-known molecular weight regulator in the polymerization system. The amount of other olefin to be used as a comonomer in the copolymerization of an olefin is generally up to 30% by weight, preferably in the range of 0.3 to 15% by weight. The polymerization reaction with the catalyst system contemplated by this invention is carried out continuously or batchwise under the conditions which are in popular use. The copolymerization reaction may be carried out in one step or in two or more steps.

EFFECT OF THE INVENTION

The catalytic component of the present invention is used effectively as a component for the catalyst in the production of polyolefin, particularly isotactic polypropylene, a random copolymer of ethylene with propylene, and a block copolymer of ethylene with propylene.

The polymerization catalyst using the catalytic component contemplated by this invention possesses high polymerization activity and high stereospecificity. The olefin polymer powder consequently obtained contains minute particles only slightly and possesses high bulk density. Further, this polymer powder abounds in flowability.

EXAMPLE

Now, the present invention will be described more specifically below with reference to working examples and application. Wherever percents (%) are mentioned in the examples, they are meant as percents by weight unless otherwise specified.

The value of heptane insolubles (hereinafter referred to as "HI" for short) which indicates the ratio of crystalline polymer in a given polymer represents the amount of residue obtained when a sample is subjected to 6 hours extraction from boiling n-heptane in a modified Soxhlet extractor. The melt flow rate (MFR) represents the value determined in accordance with ASTM D1238. The bulk density represents the value determined in accordance with Method A defined in ASTM D1895-69.

The particle size distribution of a polymer represents the value determined with standard sieves of W. S. Tyler Corp.

EXAMPLE 1

Preparation of Magnesium-containing Solid Substance

In a reaction vessel having an inner volume of 500 ml and provided with a reflux condenser and filled with nitrogen gas, 8.3 g of chips of magnesium metal (purity 99.5% and average particle diameter 1.6 mm) and 250 ml of n-hexane were placed and were stirred at 68° C.

for one hour. Then, the magnesium metal was removed from the reaction vessel and vacuum dried at 65° C., to obtain preparatorily activated magnesium metal.

The magnesium metal was mixed with 140 ml of di-n-butyl ether and 0.5 ml of 10% di-n-butyl ether solution of iodine to form a suspension. This suspension was kept stirred at 65° C. and a mixed solution of 50 ml of di-n-butyl ether and 38.5 ml of n-butyl chloride was added dropwise thereto over a period of 50 minutes. The reactants were then left reacting in a stirred state at 70° C. for 4 hours. The resultant reaction solution was cooled to 0° C.

Then, this reaction solution and 55.7 ml of ethyl orthoformate, [$HC(OC_2H_5)_3$], added dropwise thereto in a stirred state over a period of 1 hour were heated to 35° C. over a period of 1 hour and further stirred for 1 hour. At this point, formation of a solid substance was recognized. The resultant solution was heated up to 50° C. over a period of 1 hour and stirred at 50° C. for 1 hour. It was further heated up to 80° C. over a period of 1 hour and then stirred at 80° C. for 2 hours. The produced solid substance was washed six times each with 300 ml of n-hexane and then vacuum dried at room temperature for 1 hour. Consequently, there was obtained 33.8 g of a magnesium-containing solid substance containing 19.0% of magnesium and 28.9% of chlorine.

Contact with 2,2,2-trichloroethanol

In a reaction vessel having an inner volume of 300 ml and provided with a reflux condenser, a stirrer, and a dropping funnel and filled with nitrogen gas, 6.3 g of the magnesium-containing solid substance and 50 ml of n-heptane were mixed to form a suspension. The suspension kept stirred at room temperature and a mixed solution of 2.0 ml of 2,2,2-trichloroethanol (0.02 m.mol) and 11 ml of n-heptane added dropwise thereto through the dropping funnel over a period of 30 minutes were stirred further at 80° C. for 1 hour. The solid substance consequently formed was separated by filtration, washed four times each with 100 ml of n-hexane at room temperature and washed further twice each with 100 ml of toluene, to produce a toluene slurry of the solid substance.

Contact With Titanium Tetrachloride and Di-n-butyl Phthalate

The slurry of the solid substance obtained as described above was mixed with toluene until the total volume of toluene reached 40 ml and further mixed with titanium tetrachloride until the volumetric ratio of titanium tetrachloride/toluene reached 3/2 and then heated to 90° C. The resultant mixture kept stirred and a mixed solution of 3 ml of di-n-butyl phthalate and 5 ml of toluene added dropwise thereto over a period of 5 minutes were stirred at 120° C. for 2 hours. The solid substance consequently formed was separated by filtration at 90° C. and washed twice each with 100 ml of toluene at 90° C. The solid substance and titanium tetrachloride added thereto until the volumetric ratio of titanium tetrachloride/toluene reached 3/2 were stirred at 120° C. for 2 hours. The solid substance consequently formed was separated by filtration at 110° C. and washed seven times each with 100 ml of n-hexane. Consequently, there was obtained 5.6 g of a titanium-containing solid substance having a titanium content of 1.9%.

Preparatory Polymerization

In a reaction vessel having an inner volume of 300 ml and provided with a stirrer and a dropping funnel and filled with nitrogen gas, 2.0 g of the titanium-containing solid substance obtained as described above and 42.5 ml of n-heptane were stirred and cooled to 0° C. With the interior of the system vacuumized to 100 mmHg, propylene was introduced into the system until saturation of the n-heptane with propylene.

The propylene in the reaction vessel was polymerized by introducing dropwise through the dropping funnel 7.5 ml of an n-heptane solution of triethyl aluminum (TEAL) (TEAL content=1.0 mol/liter) (TEAL concentration in the reaction vessel=150 m.mols/liter). The polymerization of propylene was continued by continuously supplying propylene until the amount of the produced polypropylene reached 6.0 g. The interior of the reaction vessel was purged of propylene gas with nitrogen. Then the solid phase of the reaction system was washed five times each with 50 ml of n-hexane at room temperature. The solid phase was further vacuum dried at room temperature for 1 hour, to obtain a catalyst component.

EXAMPLE 2 AND 3

Catalyst components were prepared by following the procedure of Example 1, except the TEAL concentration in the reaction vessel during the preparatory polymerization was changed to 10 m.mols/liter (Example 2) or 60 m.mols/liter (Example 3).

EXAMPLES 4 TO 7

Catalyst components were prepared by following the procedure of Example 1, except the amount of propylene used for the preparatory polymerization was changed as indicated in the following table.

| Example | Amount of polypropylene for preparatory polymerization (g of polypropylene/g of titanium-containing solid) |
|---------|---|
| 4 | 0.46 |
| 5 | 1.4 |
| 6 | 3.9 |
| 7 | 20 |

EXAMPLES 8 TO 10

Catalytic Components were prepared by following the procedure of Example 1, except the TEAL concentration during the preparatory polymerization was changed to 30 m.mols/liter and phenyl triethoxy silane (PES) was additionally used in a varying concentration indicated below.

| Example | PES concentration (m.mols/liter) |
|---------|---|
| 8 | 10 |
| 9 | 25 |
| 10 | 50 |

EXAMPLE 11

A catalyst component was prepared by following the procedure of Example 1, except the TEAL concentration during the preparatory polymerization was changed to 150 m.mols/liter and the PES concentration to 50 m.mols/liter.

EXAMPLE 12

A catalyst component was prepared by following the procedure of Example 1, except diethyl aluminum chloride was used in the place of TEAL during the preparatory polymerization and the amount of preparatory polymer was changed to 0.62 g per g of the titanium-containing solid substance.

EXAMPLES 13 AND 14

Catalyst components were prepared by following the procedure of Example 1, except varying electron donating compound indicated below was used at a concentration of 50 m.mols/liter in the reaction system.

| Example | Electron donating compound |
|---------|---------------------------|
| 13 | Di-n-butyl phthalate |
| 14 | Diphenyl dimethoxy silane |

EXAMPLE 15

A catalytic component was prepared by following the procedure of Example 1, except a n-octyl chloride was used in the place of the n-butyl chloride during the preparation of the magnesium-containing solid substance.

EXAMPLE 16

A catalytic component was prepared by following the procedure of Example 1, except ethyl orthoacetate, $[CH_3C(OC_2H_5)_3]$, was used in the place of ethyl orthoformate during the preparation of the magnesium-containing solid substance.

EXAMPLE 17

A catalytic component was prepared by following the procedure of Example 1, except p-chlorophenol was used in the place of 2,2,2-trichloroethanol.

EXAMPLE 18

A catalytic component was prepared by following the procedure of Example 1, except p-cresol was used in the place of di-n-butyl phthalate.

COMPARATIVE EXPERIMENT 1

A catalytic component (titanium containing solid substance) was prepared by following the procedure of Example 1, except the preparatory polymerization was omitted.

COMPARATIVE EXPERIMENTS 2 TO 5

Catalytic components were prepared by following the procedure of Example 1, except TEAL (and PES) were used in varying concentrations indicated below in an atmosphere of nitrogen instead of the preparatory polymerization using propylene.

| Comparative Experiment | TEAL concentration (m.mols/liter) | PES concentration (m.mols/liter) |
|---|---|---|
| 2 | 30 | 0 |
| 3 | 67 | 0 |
| 4 | 67 | 13 |
| 5 | 150 | 0 |

APPLICATION 1

Polymerization of Propylene

In an autoclave of stainless steel (SUS 315) having an inner volume of 1.5 liters and provided with a stirrer and filled with nitrogen gas, a mixed solution obtained by mixing 2.0 ml of an n-heptane solution of TEAL (0.2 mol/liter) and 2.0 ml of an n-heptane solution of PES (0.04 mol/liter) and left standing for 5 minutes was placed. Then, 300 ml of hydrogen gas and 1 liter of liquefied propylene were introduced therein under pressure. The reaction system was heated to 70° C. and, by the addition thereto of 40 mg of the catalytic component obtained in Example 1, caused to polymerized at 70° C. for 1 hour.

After completion of the polymerization, the autoclave was purged of unaltered propylene. Consequently, there was obtained 225 g of practically transparent polypropylene. The catalytic efficiency $K_{pc}$ (amount. in g, of the formed polymer per g of the catalytic component), was 5,630 and $K_c$ (amount, in g, of the formed polymer per g of the titanium-containing solid substance) was 22,500. The produced polymer was found to have a HI of 96.2%, a MFR of 6.0 dg/min, and a bulk density of 0.42 g/cm$^3$. The particle size distribution of the polymer powder was as shown below. It was found to contain absolutely no minute particles less than 149 μm in diameter.

| Polymer particle size (μm) | Weight percent (cumulative) | Polymer particle size (μm) | Weight percent (cumulative) |
|---|---|---|---|
| Less than 149 | 0.0 | 420~590 | 24.57 |
| 149~0 | 1.20 | 590~840 | 85.84 |
| 250~350 | 3.05 | 840~1,000 | 91.29 |
| 350~420 | 5.46 | 1,000~1,680 | 100.0 |

APPLICATION 2 (COMPARATIVE EXPERIMENT)

Propylene was polymerized by using 10 mg of the titanium-containing solid substance obtained in Comparative Experiment 1. Consequently, there was obtained 142 g of white polypropylene powder having an HI of 96.1%, a MFR of 4.4 dg/min, and a bulk density of 0.39 g/cm$^3$ ($K_c$=14,200). The particle size distribution of this polymer powder is shown below. This polymer powder was found to contain 2% of minute particles less than 149 μm in diameter.

| Polymer particle size (μm) | Weight percent (cumulative) | Polymer particle size (μm) | Weight percent (cumulative) |
|---|---|---|---|
| Less than 149 | 2.0 | 420~590 | 44.0 |
| 149~250 | 4.1 | 590~840 | 92.0 |
| 250~350 | 8.9 | 840~1,000 | 96.1 |
| 350~420 | 14.2 | 1,000~1,680 | 100.0 |

APPLICATIONS 3 TO 23

Propylene was polymerized by following the procedure of Application 1, except varying catalytic components obtained in Examples 2 to 18 and Comparative Experiments 2 to 5 were used instead. The results of polymerization were as shown in Table 1.

TABLE 1

| Application | Catalytic component | Catalytic efficiency $K_{pc}$ | Catalytic efficiency $K_c$ | MFR (g/10 min.) | HI (%) | Bulk density (g/cm$^3$) | Amount of minute particles less than 149 μm in diameter (%) |
| --- | --- | --- | --- | --- | --- | --- | --- |
| 3 | Example 2 | 4,600 | 18,400 | 5.5 | 96.2 | 0.41 | 0 |
| 4 | Example 3 | 6,500 | 26,000 | 8.4 | 96.2 | 0.43 | 0 |
| 5 | Example 4 | 15,300 | 22,300 | 4.2 | 96.0 | 0.40 | 1.5 |
| 6 | Example 5 | 9,630 | 21,300 | 6.6 | 96.4 | 0.40 | 0.8 |
| 7 | Example 6 | 8,340 | 21,400 | 7.9 | 96.1 | 0.41 | 0 |
| 8 | Example 7 | 1,030 | 21,700 | 7.4 | 96.3 | 0.42 | 0 |
| 9 | Example 8 | 4,250 | 17,000 | 7.8 | 96.6 | 0.42 | 0 |
| 10 | Example 9 | 2,150 | 8,600 | 8.1 | 95.9 | 0.42 | 0 |
| 11 | Example 10 | 1,930 | 7,700 | 9.6 | 95.8 | 0.42 | 0 |
| 12 | Example 11 | 5,400 | 21,600 | 8.0 | 97.4 | 0.41 | 0 |
| 13 | Example 12 | 10,200 | 16,600 | 9.1 | 95.9 | 0.40 | 1.7 |
| 14 | Example 13 | 4,930 | 19,700 | 7.6 | 97.4 | 0.41 | 0 |
| 15 | Example 14 | 5,150 | 20,600 | 8.7 | 97.0 | 0.42 | 0 |
| 16 | Example 15 | 4,550 | 18,200 | 5.9 | 96.4 | 0.41 | 0 |
| 17 | Example 16 | 3,630 | 14,500 | 6.7 | 96.1 | 0.41 | 0 |
| 18 | Example 17 | 4,300 | 17,200 | 4.9 | 95.9 | 0.41 | 0 |
| 19 | Example 18 | 3,780 | 15,100 | 7.2 | 95.4 | 0.41 | 0 |
| 20 | Comparative Experiment 2 | — | 15,000 | 5.5 | 95.9 | 0.37 | 2.3 |
| 21 | Comparative Experiment 3 | — | 19,000 | 8.9 | 95.6 | 0.38 | 2.1 |
| 22 | Comparative Experiment 4 | — | 14,000 | 3.7 | 96.9 | 0.37 | 2.2 |
| 23 | Comparative Experiment 5 | — | 20,200 | 12.6 | 96.0 | 0.36 | 3.1 |

What is claimed is:

1. In a supported titanium-containing catalyst component obtained by contacting
   I. a magnesium-containing solid obtained by contact of (A) magnesium metal, (B) a halogenated hydrocarbon represented by the general formula RX, wherein R stands for an alkyl, aryl or cycloalkyl group having 1 to 20 carbon atoms and X for a halogen atom, and (C) a compound of the general formula $X_n^1M(OR^1)_{m-n}$, wherein $X^1$ stands for a hydrogen atom, a halogen atom, or a hydrocarbon group having 1 to 20 carbon atoms, M stands for a boron, carbon, silicon, aluminum, or phosphorus atom, $R^1$ represents a hydrocarbon group having 1 to 20 carbon atoms, m represents the valency of said atom M, and $m > n \geq 0$, with
   II. a halogen-containing alcohol, and contacting the solid product obtained with
   III. an electron donor compound and a titanium compound whereby a solid titanium-containing product is formed, the improvement comprising
   IV. contacting the titanium-containing solid with an olefin under polymerization conditions so as to incorporate to the titanium-containing solid from about 0.1 to about 100 g of polyolefin per gram of titanium-containing solid.

2. The supported catalyst component of claim 1 wherein the titanium-containing solid is contacted with the olefin in the presence of an organoaluminum compound.

3. The supported catalyst component of claim 1 wherein the olefin is propylene.

4. The supported catalyst component of claim 2 wherein the olefin is propylene and organoaluminum compound is one of triethyl aluminum or diethyl aluminum chloride.

5. A catalyst system for the polymerization of olefins comprising:
   i the supported titanium-containing catalyst component of claim 1,
   ii an organoaluminum cocatalyst, and
   iii an electron donor which can be the same as the electron donor employed in the supported titanium-containing catalyst component or an electron donor compound selected from organic silicon compounds and electron donor compounds containing a nitrogen, sulfur, oxygen or phosphorus hetero atom.

6. The catalyst system in accordance with claim 5 wherein the organo aluminum cocatalyst is aluminum triethyl and the electron donor compound is selected from phenyl triethoxy silane, ethyl benzoate, 2,2,5,5-tetramethyl piperidine, and mixtures thereof.

7. The catalyst system in accordance with claim 6 wherein the electron donor is phenyl triethoxy silane.

* * * * *